INVENTORS
EDUARD J. HAES
ADRIANUS T. VAN DER MAAT

United States Patent Office

3,530,551
Patented Sept. 29, 1970

3,530,551
APPARATUS FOR MANUFACTURING CERAMIC MAGNETIC ARTICLES
Eduard Johannes Haes and Adrianus Theodorus van der Maat, Emmasingel, Netherlands, assignors, by mesne assignments, to U.S. Philips Corporation, New York, N.Y., a corporation of Delaware
Filed Aug. 23, 1967, Ser. No. 662,599
Claims priority, application Netherlands, Aug. 27, 1966, 6612114
Int. Cl. B28b 3/20
U.S. Cl. 25—11                                    5 Claims

ABSTRACT OF THE DISCLOSURE

An apparatus for molding ceramic magnetic articles, particularly stators for small electric motors, which provides articles possessing a uniform density and a uniform magnetic field. A ceramic mass suspension is injected in a molding cavity at high pressure thereby partially separating the solid ceramic mass from the liquid. The compressed mass is further compressed by a pressing die thereby removing all the remaining liquid from the ceramic mass. The separated liquid is removed in biaxial directions from the molding cavity. The ceramic mass is magnetized during the injection and pressing operations.

---

Figure 1:
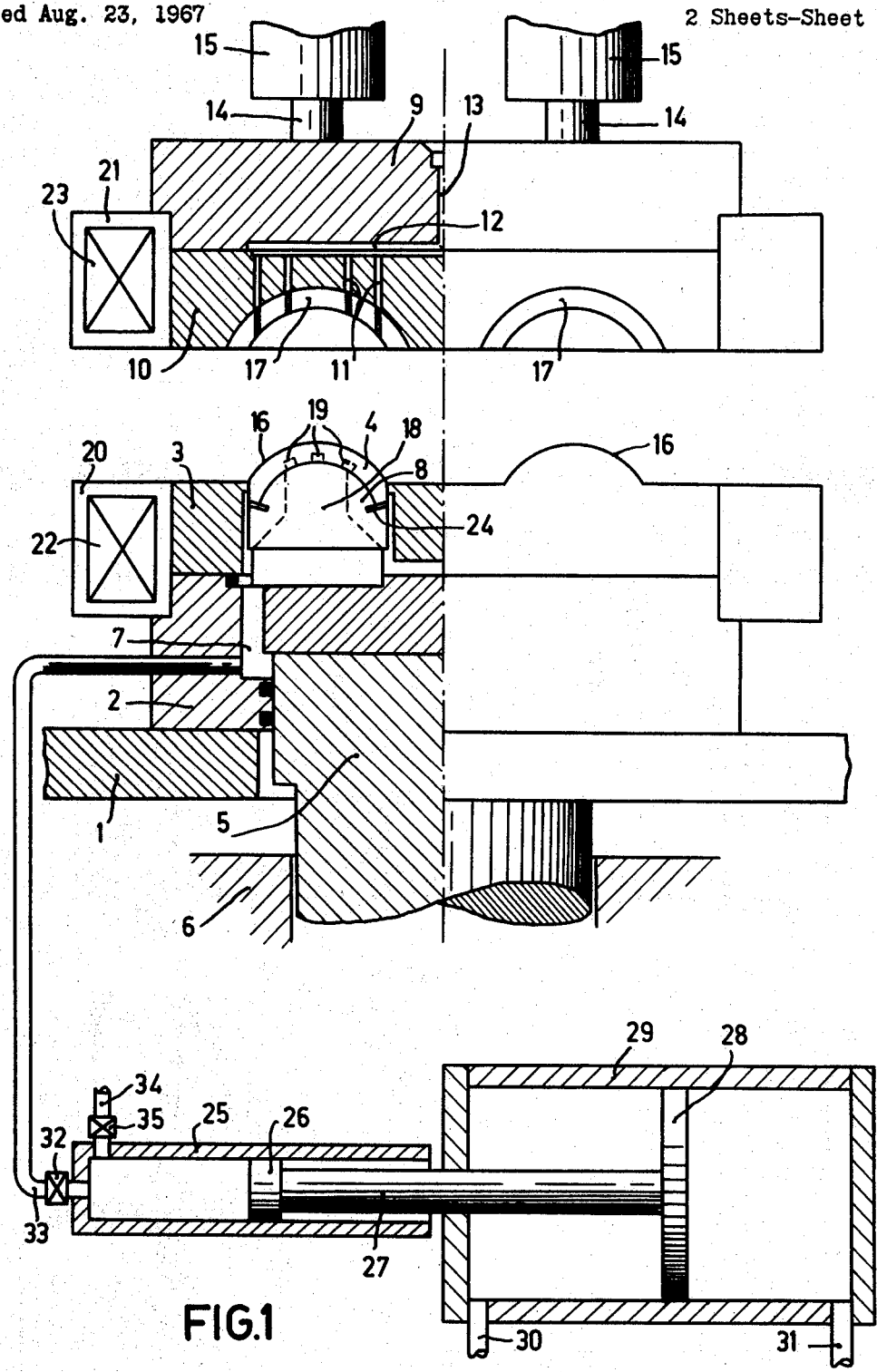

The invention relates to a method for manufacturing articles from ceramic material in a mold having at least one molding cavity which can be closed on one side by a filtering body and on the other side by a die displaceable in the cavity. The ceramic mass is supplied via a chamber in the form of a suspension to the molding cavity and is then subjected to a pressure exerted by a die, during which liquid is filtered from the ceramic mass.

According to a known method, the ceramic mass is supplied at low pressure in the form of a suspension to a chamber in front of a molding cavity, while at the same time the molding cavity is filled completely. The molding cavity is then closed on its lower side by displacement of the pressure dies and the liquid is expelled from the ceramic mass suspension through a filtering body. The ceramic mass is also compressed by the displacement of the dies. In order to expel a sufficient quantity of moisture from the ceramic mass and to compress this mass sufficiently, a long stroke of the pressure dies is required. The long stroke of the dies creates difficulty in obtaining a compressed article of uniform density. Additionally, using the prior method, it has been found that the ceramic mass can be filtered in one direction only. Since the resulting articles must have a preferential direction of magnetization, the ceramic mass is subjected to the action of a magnetic field during the pressing operation. The pressure die constitutes one of the magnetic poles. Due to the large stroke of the pressure die, it is not possible to obtain a uniform magnetic field which is substantially unidirectional during the pressing operation. Furthermore, the manufacture of articles that must be provided with a cavity requires the use of a core, for example, a mental pin. With a large stroke of the pressure die, this pin must be long so that there is a risk of rupture.

The invention has for its object to provide a method and apparatus for fabricating articles having a high and uniform density and a very satisfactory magnetic quality.

In accordance with the invention magnetic articles are fabricated from a ceramic mass suspension using a press and pressing dies. A molding cavity and an adjacent chamber, both of which are defined by a closing body and a molding body, have a ceramic mass suspension injected therein at high pressure. The cavity contains a filter body for removing liquid from the ceramic mass suspension. A plurality of grooves interconnect the chamber and the molding cavity and provide a path for the ceramic mass to enter the cavity. The pressure with which the suspension is introduced into the chamber and then the cavity causes a portion of the liquid in the suspension to separate therefrom. This separated liquid then passes from the mold cavity through the filter assembly. Next the mass is further compressed by the action of a pressing die. Movement of the pressing die separates the molding cavity from the chamber. The die, molding cavity and chamber are constructed so that movement of the die into the cavity increases the pressure therein while reducing pressure in the adjacent chamber. The remaining liquid is separated from the suspension by the die pressure and exits from the cavity via the filtering system and by the grooves surrounding the molding cavity which are connected to the chamber. As a result, an article of uniform density is obtained.

The filtering body and the pressure die may be magnetized so that they constitute opposite poles. Since the distance between the pressure die and the filtering body varies only slightly during pressing, a uniform magnetic field is maintained during the pressing operation, so that articles of optimum magnetic quality are obtained. By a suitable construction of the magnet poles, this field may be radially directed, for example, to correspond with molded segments of a cylinder having a constant radial dimension.

In a further embodiment of the device in accordance with the invention the molding cavity has a non-uniform height and is used for manufacturing an article which has a non-uniform thickness. The cross-section of the filling grooves in proximity with the portion of the molding cavity which is comparatively high, is smaller than the cross-section of the filling grooves in proximity with the area at which the molding cavity is comparatively low. By this construction articles of varying cross-section can be produced which have a uniform density since, during the pressing operation, a small quantity of suspended material will flow with the liquid from the ceramic mass through the filling grooves back to the chamber. At areas at which the cross-sections of the filling grooves are larger, the quantity of ceramic mass conducted back to the chamber will be larger than at the areas at which the cross-sections of the filling grooves are smaller. Thus, when a suitabe size is chosen for the filling grooves depending upon the thickness of the product to be molded, the relative compression of the whole product will be substantially uniform.

In a further embodiment of the device according to the invention, in which both the dies and the closure body are subjected by means of electric coils to the action of a magnetic field, the parts of the closure body cooperating with the mold are provided with non-magnetic dishes and the dies supported by the pressing plunger are provided near their periphery with nonmagnetic insertion pieces, In this manner, a completely radially directed field is obtained when cylindrical segments are molded. The pressing operation does not interfere with the magnetic field since the dies are displaced through a small distance towards the closing body.

Figure 2:
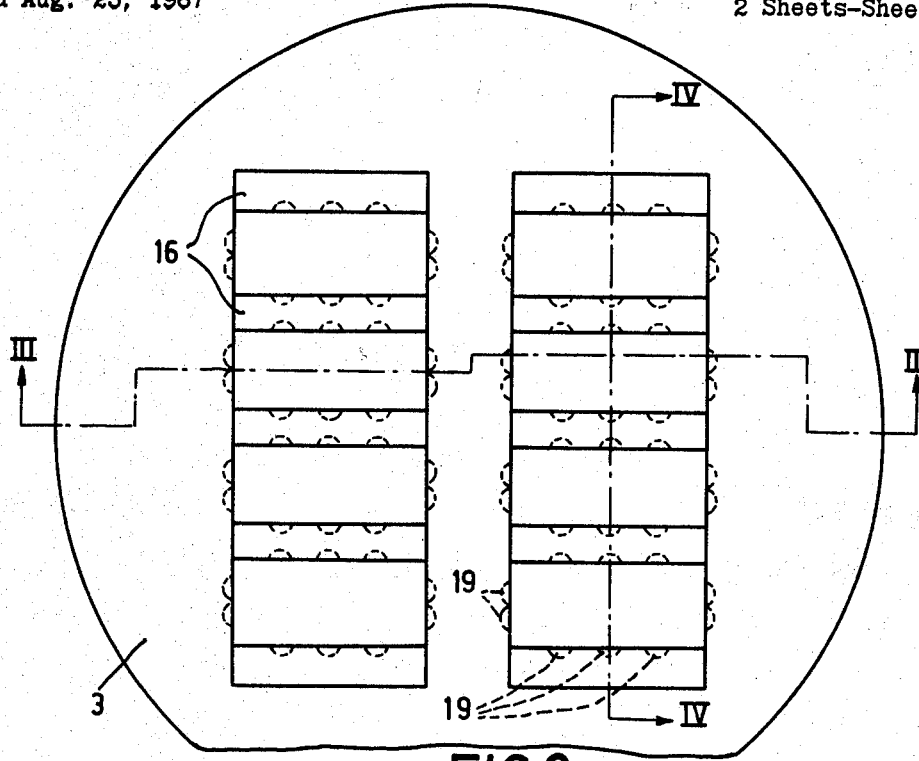
Figure 3:
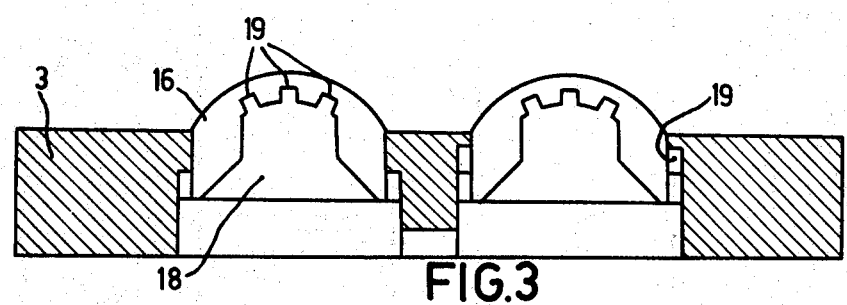
Figure 4:
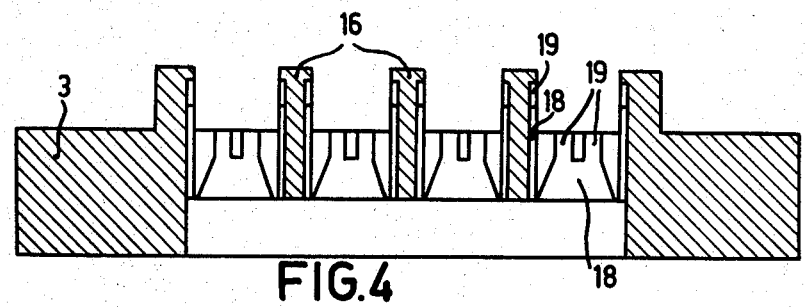

The invention will now be described in greater detail with reference to the drawing, which shows an embodiment of the molding device, in which:

FIG. 1 shows an apparatus for fabricating magnetic cylindrical segments in accordance with the invention, FIG. 2 is a plan view of a molding plate used in the device of FIG. 1, FIG. 3 is a sectional view taken on the line III—III of FIG. 2, and FIG. 4 is a sectional view taken on the line IV—IV of FIG. 2.

A molding body 2 bears on a frame 1. The molding body has secured to it a molding plate 3 provided with cavities located at 4. A pressing plunger 5 which is displaceable in a cylinder 6 extends into a chamber 7 in the molding body 2. The upper end of the pressing plunger is provided with pressing dies 8 extending to the edge of the molding cavities 4 and is displaceable therein. The upper walls of the molding cavities 4 are defined by a closing body 9. This closing body includes a plate 10 provided with apertures 11 opening into a channel 12 connected to a vacuum duct 13. The closing body is secured to two plungers 14 which are displaceable with the aid of pressing cylinders 15.

The molding plate 3 which is of a non-magnetic material, has cylindrical ribs 16. The molding cavities 4 are located between two adjacent ribs. The pressure dies 8 have a cylindrical upper surface and the closing body 9 includes hollow dies provided with non-magnetic dishes 17 which in the closed position of the mold, press on the molding ribs 16 and thus close the molding cavities 4 on the upper sides. A filtering cloth (not shown) is provided on the concave sides of the dishes 17. In the embodiment shown, the cavity in which the articles are molded has the form of a segment of a cylinder. Filling grooves in the molding plate 3 extend from the chamber 7 in the molding body 2 into the molding cavities 4. Each of the filling grooves include a relatively wide inlet slot 18 facing the chamber 4 which terminates in a plurality of smaller grooves 19. The grooves are distributed around the molding cavities 4 as shown in FIGS. 2, 3 and 4.

The molding body 2 and the closing body 9 are surrounded by an annular member 20 and 21, respectively. These members are each provided with a cavity 22 and 23, respectively, for accommodating electric coils. The coils magnetize the dies 8 and the closing body 9 when current passes through the coil windings.

A mechanism (shown diagrammatically) for supplying a ceramic suspension to the chamber 7 of the mold, includes a cylinder 25 having a reciprocating piston 26 therein. The piston 26 is coupled by means of a rod 27 to a piston 28 of larger diameter. The piston 28 reciprocates in the cylinder 29, preferably by means of pressurized oil alternately applied to the opposing faces of piston 28 through ducts 30 and 31. The ducts also serve as drains when the piston 28 is moved to the right. The cylinder 25 is filled with the ceramic mass suspension which is suppplied through a duct 34 via a valve 35. When the piston 28 is moved to the left, the valve 35 is closed and the ceramic mass suspension in the cylinder is subjected to a high pressure thereby injecting the mass into chamber 7 and the cavity 4 via the valve 32 and the duct 33.

At the beginning of the molding cycle, the pressing plunger 5 assumes the position shown in FIG. 1 in which the molding cavities 4 of the mold communicate with the chamber 7 only via the filling grooves 18. The closing body 9 is pressed against the upper side of the molding plate 3 with the aid of the pressing cylinder 15. Subsequently, oil is pumped at a pressure through the duct 31 into the cylinder 29, as a result of which the piston 26 moves to the left (cf. FIG. 1). The ceramic mass suspension which is in cylinder 25 is supplied to the chamber 7 at a pressure of approximately 100 atmospheres. The suspension flows through the filling grooves 19 to the molding cavities 4 at this high pressure. By this high-pressure filling method, the suspended ceramic mass suspension is filtered, whereby liquid is drained through the apertures 11 into the vacuum duct 13. The filtering is readily accomplished since the injected mass which is injected into the molding cavity fills the cavity from the filtering cloth downward. After the high-pressure filling, the mass is considerably precompressed and it contains only a small quantity of liquid. After filling, the valve 32 is closed so that the communication between the chamber 7 and the cylinder 25 is interrupted. The ceramic mass in the molding cavities is now further compressed by displacement of the pressure dies 8 which move towards the closing body 9. Since the ceramic masses in the respective cavities are already pre-compressed and only a comparatively small quantity of liquid is still to be filtered, the stroke of the dies 8 may be very short. The cross-sectional area and hence the volume of the pressing plunger 5 which is introduced into the chamber 7 is chosen to be smaller than the sum of the cross-sectional areas and hence the volume of the dies 8. During the displacement of the pressing plunger 5 towards the mold, the volume of the pressure dies 8 introduced from the chamber into the molding cavities will be larger than that of the pressing plunger introduced into the chamber 7. The volume in the chamber 7 available for the suspension thus increases with the forward stroke of the pressing plunger so that the pressure in the chamber 7 decreases. The pressure dies exert a high pressure, for example, of 300 kg./cm.$^2$, on the ceramic mass in the mold. The remaining liquid present in the mass is thus filtered through the closing body 9. However, since during the pressing operation by the dies 8 the pressure in the chamber 7 decreases, liquid is also ejected through the filling grooves 19 to the chamber 7. Due to this bilateral filtering, uniformly compressed products are obtained. At the beginning of the pressing stroke, a small quantity of ceramic mass also flows with the liquid through the filling grooves 19 to the chamber 7. This occurrence is beneficial for providing a uniform density in articles which, when viewed in the direction of pressing, have a non-uniform height. For example, when the height of an article having the form of a segment of a cylinder which is to be molded is smaller at the center than at the edges, a given stroke of the pressure dies would compress, subjecting the edges of the mold to greater compression than the center. If the cross-section of the filling grooves 19 at the area of the minimum height of the product to be molded is chosen to be larger than the cross-section of the filling grooves at the area of the maximum height, the groove at the area of the minimum height will emit a larger quantity of ceramic mass and liquid to the chamber during the pressing operation of dies 8, so that the density becomes substantially uniform throughout the product.

After the products in the molding cavities 4 have been compressed, the closing body 9 is moved upwards by the cylinders 15. The pressing plunger 5 is displaced upwards and the products are pushed out of the molding cavities. The pressing plunger 5 is then returned to the position shown in FIG. 1 where the device is ready for the next complete pressing cycle.

A non-magnetic insertion piece may be used with the dies 8. These insertion pieces 24 are employed in order to provide a substantially radially extending magnetic field on the face of the molded article when the coils in the cavities 22 and 23 are electrically energized. Since the distance between the pressing dies and the closing body varies only slightly during the pressing operation by the dies 8, this radial direction of the magnetic field is maintained during the operation. The method in which the mold is filled at high pressure so that only a short pressing stroke by the dies 8 is required, thereby providing an article which has been filtered bilaterally and has a uniform and radially directed magnetic field, is particularly suitable for manufacturing products of Ferroxdure which must have a very uniform density in order to ensure satisfactory magnetic properties.

It should be appreciated that the method described may also be used for molding products having a shape different from the shape shown. The shape of the molding cavity, the pressing face of the die and the closing body must be adapted to the desired shape of the product to be manufactured, while it may also be required to adapt the filling pressure, the additional pressing stroke and the size of the filling grooves.

What is claimed is:

1. Apparatus for manufacturing ceramic magnetic articles comprising: a molding plate having a molding cavity therein; a molding body adjacent to said molding plate, said molding body having a chamber therein in communicating relationship with said molding cavity; a movable closure body overlying said molding plate and defining one wall of said molding cavity when said closure body and said molding plate are in abutting contact, means for injecting a ceramic mass suspension into said chamber and said molding cavity at high pressure, a pressing plunger positioned in said chamber, a pressure die mounted on said plunger for compressing said ceramic mass in the molding cavity to remove the liquid therefrom, said pressure die further having means for varying the volume of the chamber during the compression of the suspension to accommodate the liquid, filtering means for conducting the removal of the liquid including grooves defined in the walls of the molding cavity interconnecting the cavity and the chamber; and magnetic field producing means for magnetizing said ceramic mass.

2. Apparatus according to claim 1 wherein said closure body has apertures passing therethrough for transmitting fluid from said molding cavity said filtering means further includes means adjacent said apertures for removing fluid from said molding cavity; and said grooves and apertures are aligned to transmit fluid from said cavity along axes substantially normal to each other thereby providing biaxial filtering.

3. Apparatus for manufacturing ceramic magnetic articles according to claim 1, wherein the surface of said closing body adjacent said molding cavity is a concave cylinder and the face of said pressure die is a convex cylinder thereby defining a molding cavity having the shape of a segment of a cylinder.

4. Apparatus for manufacturing ceramic magnetic articles according to claim 3 wherein said molding cavity has the shape of a segment of a cylinder of variable radial dimension.

5. Apparatus for manufacturing ceramic magnetic articles according to claim 3 wherein said surface of said closure body adjacent said molding cavity is non-magnetic and said die surface includes portions of non-magnetic material for insuring a radially directed magnetic field in said ceramic mass.

References Cited

UNITED STATES PATENTS 2,770,025  11/1956  Möllers _____ 25—29 X
3,274,303  9/1966   Müllers _____ 264—24

J. SPENCER OVERHOSLER, Primary Examiner

D. W. JONES, Assistant Examiner

U.S. Cl. X.R.

249—141; 264—24; 164—120; 18—23